(12) United States Patent
Keller-Tuberg

(10) Patent No.: US 6,504,844 B1
(45) Date of Patent: Jan. 7, 2003

(54) HIGH SPEED INTERNET ACCESS

(75) Inventor: Stefan Paul Keller-Tuberg, Raleigh, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/057,287

(22) Filed: Apr. 8, 1998

(30) Foreign Application Priority Data

| Apr. 9, 1997 | (AU) | PO6105 |
| Apr. 28, 1997 | (AU) | PO6431 |

(51) Int. Cl.⁷ .............................................. H04L 12/66
(52) U.S. Cl. ....................... 370/397; 370/401; 370/537
(58) Field of Search ................................ 370/401, 402, 370/466, 474, 395, 352, 355, 356, 537, 396, 397, 399, 395.4, 540

(56) References Cited

U.S. PATENT DOCUMENTS

| 5,724,355 A | | 3/1998 | Bruno et al. ................ 370/401 |
| 5,737,333 A | * | 4/1998 | Civanlar et al. ............ 370/352 |
| 5,828,666 A | * | 10/1998 | Focsaneanu et al. ........ 370/389 |
| 5,889,773 A | * | 3/1999 | Stevenson, III ............. 370/352 |
| 5,903,559 A | * | 5/1999 | Acharya et al. ............. 370/355 |
| 5,936,936 A | * | 8/1999 | Alexander, Jr. et al. .... 370/216 |
| 5,940,598 A | * | 8/1999 | Strauss et al. ......... 395/200.79 |
| 5,958,018 A | * | 9/1999 | Eng et al. .................... 709/246 |
| 5,999,535 A | * | 12/1999 | Wang et al. ................. 370/401 |
| 6,009,097 A | * | 12/1999 | Han ............................ 370/395 |
| 6,055,561 A | * | 4/2000 | Feldman et al. ............. 709/200 |
| 6,101,182 A | * | 8/2000 | Sistanizadeh et al. ....... 370/352 |
| 6,157,649 A | * | 12/2000 | Peirce et al. ................. 370/401 |
| 6,160,819 A | * | 12/2000 | Partridge et al. ............ 370/474 |
| 6,327,258 B1 | * | 12/2001 | Deschaine et al. .......... 370/356 |

FOREIGN PATENT DOCUMENTS

| JP | 2-134943 | 5/1990 |
| JP | 9-214564 | 8/1997 |
| JP | 10-107852 | 4/1998 |
| JP | 10-247946 | 9/1998 |
| JP | 10-308762 | 11/1998 |

OTHER PUBLICATIONS

M. DePrycker, "Asynchronous Transfer Mode/Solution for Broad-band ISDN", Third Ed., Prentice Hall Int'l (UK) Ltd., Hertfordshire U.K., 1995, pp. 77–96, 131–134.

* cited by examiner

*Primary Examiner*—Min Jung
(74) *Attorney, Agent, or Firm*—Ware, Fressola, Van Der Sluys & Adolphson LLP

(57) ABSTRACT

In an Internet communication between a terminal 10 and an Internet Service Provider (ISP) 8 of a network 6, a plurality of ATM data messages 35 from the terminal 10 to the ISP 8 are assembled into a single packet 37 at the edge of the network 6 while maintaining the ATM Header 38. Thus the amount of processing to transfer data across the network 6 is reduced compared to an Internet communication in which each ATM message is processed at each node in a network. At the ISP 8, the packets can be de-multiplexed and the original ATM messages reconstructed.

21 Claims, 2 Drawing Sheets

HIGH SPEED INTERNET ACCESS

TECHNICAL FIELD

This invention relates to a method and arrangement of providing high speed data services to a large number of users via a communications network.

BACKGROUND ART

The provision of mass market Internet services presents traffic management problems for both telecommunications carriers and Internet Service Providers.

At present most private users are connected to the Internet over modems which operate in the voice band. These services have low transmission rates and also tie up the exchange connection preventing simultaneous use of the phone on the same line and loading the exchange.

High speed access technologies have emerged which make the delivery of fast data and data-like services practical for the mass/brood market. Such technologies include transmission technologies such as ADSL and Hybrid Fibre Coax and multiplexing/Switching technologies such as ATM. A number of Internet Protocol (IP) based access services have been implemented and often use ATM as an underlying transport technique. However in these implementations, the carriage of services is usually based on the Internet Protocol and so the underlying ATM flows must be terminated at each location at which IP traffic is processed.

Therefore in IP based access networks which use ATM as the underlying transport, the advantages of using end to end ATM are foregone.

For an ATM end to end based access service, it has been necessary to establish individual ATM connections carrying AAL5 encapsulated data across the entire network between each subscriber and their ISP(s) of choice. In a mass market deployment of ATM technology, for example high speed Internet access based on ATM to residential subscribers, the number of ATM flows can amount to tens to hundreds of thousands simultaneously.

A service provider, such as an Internet Service Provider, may need to terminate an individual information flow from each of its subscribers. This requirement could be imposed for service reasons, billing reasons, security reasons or routing reasons.

Typical large ISPs must design their systems to cope with up to hundreds of thousands of subscribers.

In an ATM connected scenario, at least two issues arise for service providers:

ATM interface cards for switches and workstations terminate a finite maximum number of simultaneous ATM connections. Typically, this maximum number of connections is of the order of 1000 or fewer. This maximum number of ATM connections is significantly fewer than the number of subscribers to a large ISP.

The cost of leased public ATM links is generally relatively expensive compared with the competitive price charged for a single residential internet service. In order to remain viable, ISPs offering high speed internet access over ATM would therefore require each leased ATM link into the public network to be shared by a relatively large number of residential subscribers. Certainly, the number of subscribers sharing a 155 Mbit/s link (for example) would need to be much greater than 1000.

Routing in the access network via traditional means is unsuitable in a multi service provider environment or in an environment where the service provider is different from the access network provider. This is because "routing" is a service which provides a value added connectivity and could potentially lead to traffic nominally served by a particular service provider to bypass or be routed around that service provider altogether.

Other issues arise in an ATM connected scenario which affect both access carriers and service providers:

The logistical and technical difficulty of managing individual end to end ATM connections for each subscriber is significant.

Internet standards can be found on the Internet at: http://ds1.internic.net/std/

A description of the ATM cell and header structure is given in the book "Asynchronous Transfer Mode-Solution for Broadband ISDN", Martin de Prycker; Prentice Hall, 3rd ed, 1995, at page 63 et seq. Essentially the information field is relatively small to minimize buffer size, and the header is used only to identify the link through the next stage, which contains a translation table to replace the header on the outgoing cells for use in the subsequent stage. ATM operates in a connection-oriented mode where the virtual connection is identified by the ATM header and the translation tables.

DISCLOSURE OF THE INVENTION

It is desirable to extend higher speed links to broad or mass market data services. This specification discloses an architecture capable of delivering Internet and other data services to hundreds of thousands of subscribers. In the preferred solution the Internet subscribers are linked into a packet network using ATM in an end to end manner. In a specific embodiment the ATM link is implemented using ADSL over the copper pair. ADSL operates outside the voice band so this opens the possibility of operating a conventional phone and the Internet connection simultaneously. An access gateway is used within the communications network to terminate the ATM connections and map the traffic using multiplexing into a single connection for the ISP. The data may be managed at the AAL5 layer level (ATM Adaptation Layer 5) at the user and exchange interface.

At the service provider interface, traffic arrives from a large number of subscribers multiplexed into a much smaller number of ATM flows. Traffic directed from the service provider towards the subscribers is multiplexed by the service provider into the appropriate flow towards that subscriber's access gateway.

This specification describes an internet communication system including a plurality of subscribers connected to a plurality of service providers via a communication network;

wherein each subscriber is able to communicate with a predetermined one (or more) of the service providers over a private individual logical link (or links) or data flow (or flows) using a communication protocol;

wherein data flows from individual subscribers are terminated in the communication network close to the subscribers and multiplexed together for transmission to the predetermined service provider.

In a preferred arrangement, the connection between the user and the exchange utilizes an ATM protocol which may, for example, be implemented over an ADSL or other suitable high speed link.

In a further embodiment the communications network includes one or more geographically diverse exchange locations around which subscribers in the area are grouped through an access network.

In a further embodiment the communication network includes one or more data gateway devices collocated with one or more such devices more centrally located than the exchange locations and concentrating subscriber traffic into a central access network.

In a fourth embodiment the service providers are coupled to the central access network via a high speed communication link.

In a fifth embodiment the service providers are coupled to the central access network directly or via data gateway devices.

In a sixth embodiment destination address information, or source address information or a combination thereof from the communication protocol is used to uniquely identify the routing of data packets.

In a preferred arrangement, the routing means within the data gateway are configured to prevent direct communication between one subscriber and another through the data gateway.

Also in a preferred arrangement, the routing means within the data gateway are configured to prevent direct communication between one ISP and another through the data gateway.

In a still further embodiment, when the ATM flows are processed in the data gateway, the ATM VP/VC for each individual connection is practically terminated but a logically unique connection path is maintained across the full span of the connection between the subscriber and their service provider.

In yet another embodiment when the ATM flows are practically terminated, the ATM VP/VC is stored and the ATM VP/VC identifier is used as a basis for multiplexing data flows from one or more subscribers addressed to a particular service provider into shared VP/VC flows between the gateway and service provider.

In yet another embodiment the ATM flows from a subscriber are terminated at the data gateway to which the subscriber is connected, and wherein the said data gateway includes tables for use in multiplexing using ATM VP/VC identifiers.

Another embodiment provides that a multiplexing table is used for upstream traffic, and a de-multiplexing table is used for downstream traffic.

Preferably, in the multiplexing tables, each logical subscriber connection is associated with only one service provider. Each service provider is preferably associated with a list of subscribers.

Optionally, one or more subscribers may have more than one logical connection to enable the subscriber to connect to more than one service provider.

In another embodiment the communication network includes a plurality of data gateways, and wherein there is a separate multiplexed VP/VC flow between each data gateway and each service provider.

Preferably, protocol address sharing, for example Internet Protocol address sharing, is implemented within the service provider to facilitate simultaneous connection of a large number of subscribers to the network, for example The Internet, using a much smaller number of network addresses.

In another embodiment the gateway forwards traffic on the basis of a static connection between the logical subscriber port and the service provider.

In a still further embodiment the gateway forwards traffic in the direction from the subscriber towards the service provider on the basis of the packet source address which is an address associated with a corresponding subscriber.

In a still further embodiment the gateway forwards traffic in the direction from the service provider towards the subscriber on the basis of the packet destination address which is an address associated with a corresponding subscriber.

In yet another embodiment the data gateway includes a means in the direction from subscriber towards ISP to verify the legitimacy of the source address provided by the subscriber in each subscriber packet.

In yet another embodiment the data gateway includes a means to discard packets with illegitimate source addresses directed from a subscriber towards an ISP.

In still another embodiment the data gateway includes a means to overwrite the source address before forwarding packets directed from a subscriber towards an ISP in which the original packet contains an illegitimate source address.

In yet another embodiment the data gateway includes a means in the direction from ISP towards subscriber to verify the legitimacy of the source and destination addresses provided by the ISP in each ISP packet.

In yet another embodiment the data gateway includes a means to discard packets with illegitimate source or destination addresses directed from an ISP towards a subscriber.

In still another embodiment the data gateway includes a means to overwrite the source address before forwarding packets directed from an ISP towards a subscriber in which the original packet contains an illegitimate source address.

The invention also provides method of implementing Internet communication in conjunction with the above arrangements.

The invention will be described with reference to the connection of a plurality of Internet users to a number of Internet Service Providers (ISP), or quasi-ISP such as corporations providing telecommuting facilities for their employees. The term "service provider" will be used to refer to both ISPs and quasi-ISPs.

DESCRIPTION OF THE INVENTION

Figure 1:
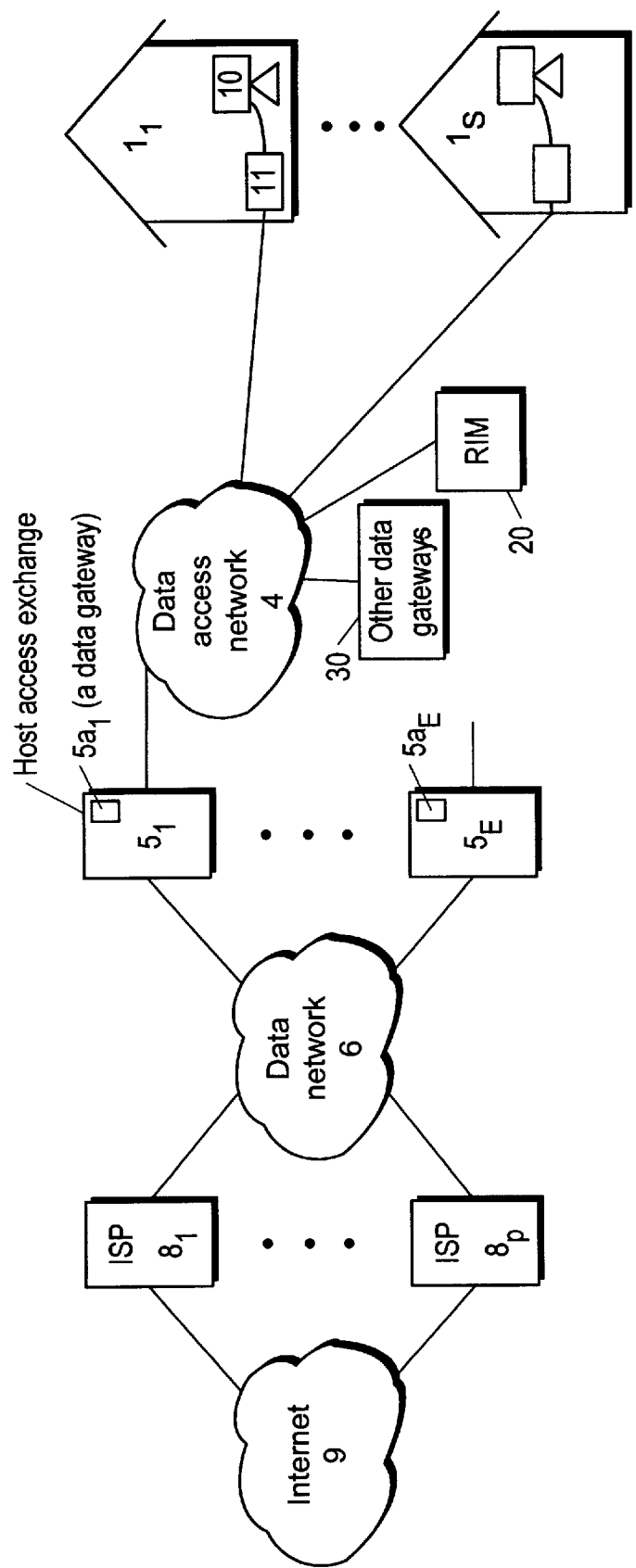
FIG. 1 shows an end to end architecture for a mass market Internet access system embodying the invention, including a subscriber data network exemplified in the drawing as an ADSL access network.

FIG. 1 is a representation of end to end Internet access implemented using the invention. A plurality of subscribers $1_1 \ldots 1_s$ or RIMs (Remote Integrated Multiplexers) 20 (also known as Metropolitan Area Networks) or other data gateways 30 are connected to the host access exchange $5_1$, including a data gateway $5a_1$ (also called here an access gateway), via a data access network 4. A plurality of access exchanges $5_1 \ldots 5_E$, each containing a data gateway $5a_1 \ldots 5a_E$, are interconnected through data network 6. A plurality of Internet Service Providers (ISPs) of other types of service providers $8_1 \ldots 8_P$ are each connected between the Internet or other data infrastructure 9 and the data network 6.

Each subscriber may have one or more computers, 10, and modems, 11, each of which may be registered with a different service provider.

The data access network may include ADSL links over copper pairs which originate at a gateway such as a local exchange or Remote Integrated Multiplexer (RIM) connected to the rest of the telecommunications network via high capacity links such as optical fibers.

RIM equipment serves as a point of termination of the ADSL connection which can be located sufficiently close to the subscribers to enable ADSL to be used over the installed copper pair base at information speeds compatible with high speed data services.

Other high speed links to subscribers may also be used, e.g., SDH, Hybrid Fiber Coax etc.

Information to be sent to the ISP by the subscriber is initially assembled in packet form and then converted to an efficient form for transmission.

Preferably, communication from the subscriber is carried using ATM, packets for transmission being divided into ATM cells.

However, in the telecommunications network, a large number of end to end ATM paths between individual subscribers and their ISP's may exhaust resources in the ATM switches and be unwieldy to manage and maintain.

The ATM flows from each subscriber are practically terminated and remultiplexed into simpler flows to the service providers close to the edge of the network. This may be at the local exchange which is connected to a number of RIMs so as to gather sufficient Internet traffic to provide a worthwhile aggregate load for efficient packet transmission. Alternatively, where there is sufficient traffic at the RIM, the subscriber ATM flows may be terminated there.

The remultiplexed packets are forwarded through the network at the packet layer. The originating VP/VC identifier may be used as the basis for multiplexing so as to maintain a logically unique end to end relationship for each connection between a subscriber and a service provider.

Figure 2:
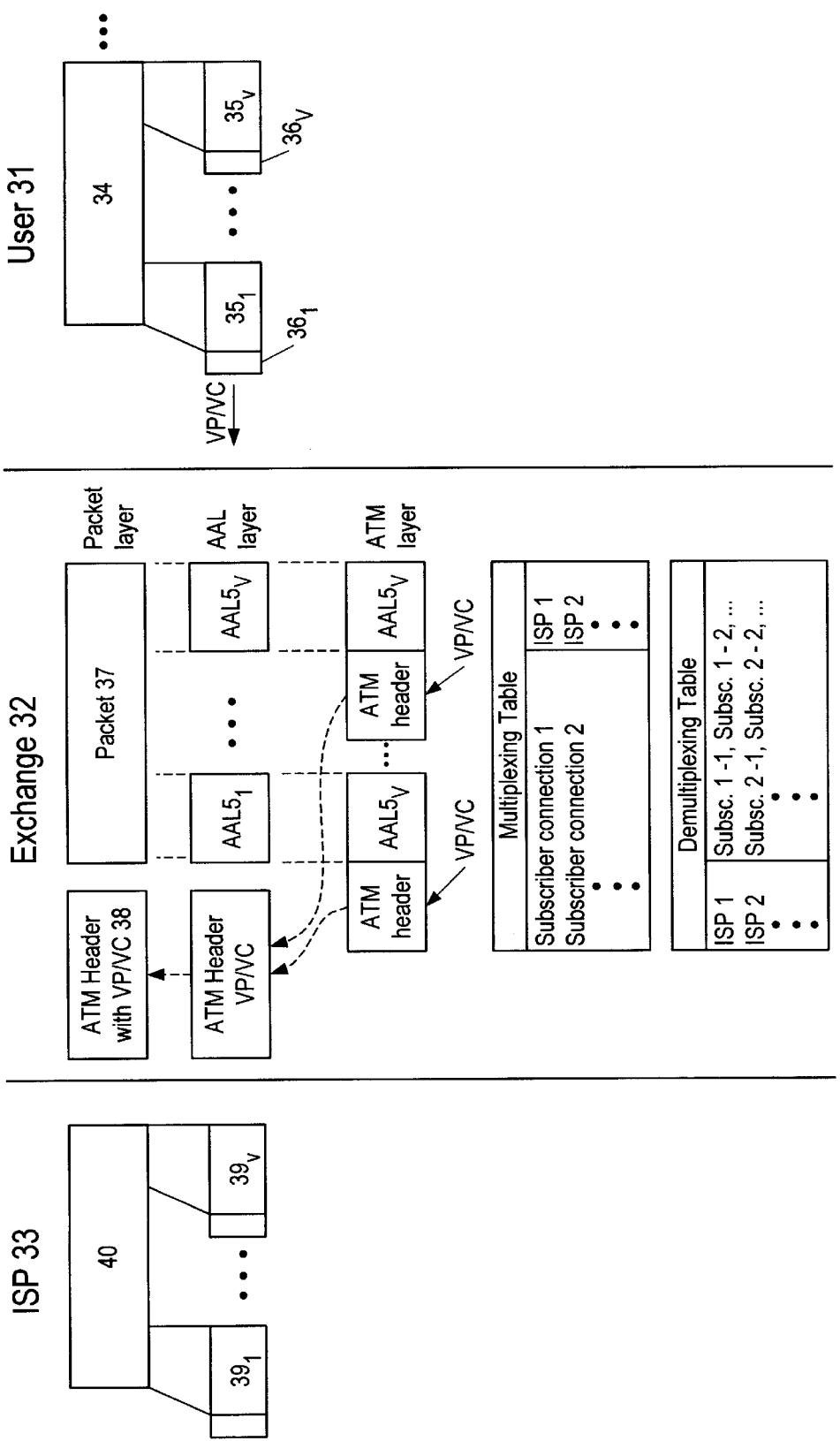
FIG. 2 illustrates the process of transferring data from the subscriber to the ISP, via the network.

As shown in FIG. 2, packets, 34, to be sent from the user are converted into ATM format using AAL5 encapsulation and ATM VP/VC addresses, e.g., using an ATM card in the user's PC or data modem, which breaks up the packet into ATM cells, 351 . . . 35 V, and adds cell headers, 361 . . . 36 V, for transmission to the exchange network in ATM format. The packet level source and destination addresses are transmitted with other packet header information.

At the user exchange interface, the ATM user's flows are terminated and the data assembled into packets 37 including the original packet source and destination addresses, for onward transmission through the network. Specifically for each packet which is processed 37,38, reference to the incoming VP/VC is maintained 38 and this reference can be used to simplify onward forwarding. In this way, the ATM flow from the subscriber is practically terminated but the reference to VP/VC is not lost.

The VP/VC reference associates each ATM flow on the subscriber's line with a previously assigned ISP via a look up table. Referring again to FIG. 2, as mentioned, the ATM flows from a subscriber are terminated at the data gateway to which the subscriber is connected; each such data gateway includes tables for use in multiplexing using ATM VP/VC identifiers. A multiplexing table is used for upstream traffic, and a demultiplexing table is used for downstream traffic. In a multiplexing table, each logical subscriber connection is associated with only one service provider. In a demultiplexing table, each service provider is associated with a list of subscribers.

At the exchange/ISP interface in the direction from subscriber to ISP, the VP/VC packet flows from many individual subscribers are multiplexed into shared service provider VP/VC packet flows. At the exchange therefore, subscriber's incoming packet is directed towards an ISP on the basis of its VP/VC identifier rather than on the basis of its packet source or destination address.

The data gateway at the exchange may optionally perform a verification of the packet source address provided by the subscriber in order to detect and prevent any one subscriber from masquerading as a different subscriber. In order to perform an optional source address verification, the data gateway includes a means, such as an association table, which uniquely specifies one or more source addresses which that subscriber is permitted to use in their communication with the specific ISP to which that subscriber's connection is made. If the packet source address verification indicates that the subscriber has specified a source address which has not been configured to be permitted by the data gateway, the data gateway may discard the packet in its entirety or alternately forward a modified version of the packet towards the ISP after overwriting the incorrect source address with an acceptable source address from the association table.

At the exchange/ISP interface in the direction from ISP to subscriber, the VP/VC packet flow from each ISP is demultiplexed into many individual subscriber VP/VC packet flows towards the subscribers. At the Exchange therefore, ISP's incoming packet is directed towards a subscriber on the basis of its packet destination address. In order to perform an optional ISP packet verification and in order to prevent ISPs other than the ISP legitimately associated with a specific subscriber connection from communicating with the subscriber on that specific subscriber connection, the data gateway includes a means, such as an association table, which specifies a VP/VC identifier and the permitted ISP packet source address or addresses which may be used to direct a packet towards the subscriber in conjunction with the packet destination address. If the VP/VC, source address and destination address verification indicates that an ISP is attempting to direct a packet towards a subscriber which does not have a specific connection to that ISP, the data gateway discards the packet in its entirety.

According to AAL5 protocol, each packet is sent as a contiguous flow of uninterrupted ATM cells such that the cells of one packet are not intermixed with the cells of another on the same ISP VP/VC. At the ISP, ATM cells are terminated and the data reassembled into packets, 40.

Suppose groups of n ATM cells (of size x bytes) each with their own header are assembled into a single packet (of size y bytes) with a single header, then the number of processing operations required through the various stages of the network to convey the data from the subscriber's port at the subscriber's gateway, to the service provider's port at the service provider's gateway is reduced by a factor of n.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An internet communication system including a plurality of subscribers connected to a plurality of service providers via a communication network, wherein each subscriber is able to communicate with a predetermined one of the service providers over an individual logical link or data flow using a communication protocol, wherein data flows from individual subscribers are terminated in the communication network close to the subscribers and multiplexed together for transmission to the predetermined service provider, wherein the communication protocol is according to an asynchronous transfer mode (ATM) and the ATM flows are processed in a data gateway, an ATM virtual path/virtual connection (VP/VC) for data packets of each individual connection being practically terminated, and wherein a logically unique connection path is maintained across a full span of a connection between a subscriber and a service provider, and wherein an ATM VP/VC identifier is used as a basis for multiplexing data packets from one or more subscribers addressed to a particular service provider into shared VP/VC data flows between the data gateway and the service provider.

2. A system as claimed in claim 1, wherein the communications network includes one or more geographically diverse exchange locations around which subscribers in an area are grouped through an access network.

3. A system as claimed in claim 2, wherein the communication network includes one or more data gateway devices collocated with or more centrally located than the exchange locations concentrating subscriber traffic into a central access network.

4. A system as claimed in claim 3, wherein the service providers are coupled to the central access network via a high speed communication link.

5. A system as claimed in claim 3, wherein the service providers are coupled to the central access network directly or via data gateway devices.

6. A system as claimed in claim 3, wherein each subscriber is assigned one or more protocol addresses which uniquely identify that subscriber within the access network and the central access network.

7. A system as claimed in claim 3, wherein each service provider is assigned one or more protocol addresses which uniquely identify that service provider within the access network and the central access network.

8. A system as claimed in claim 3, wherein a gateway device forwards traffic on the basis of a static connection between a logical subscriber port and the service provider.

9. A system as claimed in claim 1, wherein destination address information, or source address information or a combination thereof from the communication protocol is used to uniquely identify routing of data packets.

10. A system as claimed in claim 1, wherein the data flows according to the ATM communication protocol from a subscriber are terminated at a data gateway to which the subscriber is connected, and wherein said data gateway includes tables for use in multiplexing using ATM VP/VC identifiers.

11. A system as claimed in claim 10, wherein a multiplexing table is used for upstream data packet traffic, and a de-multiplexing table is used for downstream traffic.

12. A system as claimed in claim 11, wherein in the multiplexing table, each logical subscriber connection is associated with only one service provider.

13. A system as claimed in claim 11, wherein in the demultiplexing table, each service provider is associated with a list of subscribers.

14. A system as claimed in claim 1, wherein at least one subscriber may have more than one logical connection to enable the subscriber to connect to more than one service provider.

15. A system as claimed in claim 1, wherein the communication network includes a plurality of data gateways, and wherein there is a separate multiplexed VP/VC flow between each data gateway and each service provider.

16. A system as claimed in claim 1, wherein protocol address sharing is implemented within the service provider to facilitate simultaneous connection of a large number of subscribers to the network using a much smaller number of network addresses.

17. A system as claimed in claim 1, wherein in a direction from subscriber to service provider, data packet address information is inspected to implement security screening.

18. A system as claimed in claim 17, wherein packets with illegitimate addresses which fail the security screening are alternatively either discarded or modified in such a manner that they meet the requirements of the security screening.

19. A system as claimed in claim 1, wherein in a direction from service provider to subscriber, data packet address information is inspected to implement security screening.

20. A system as claimed in claim 19, wherein packets with illegitimate addresses which fail the security screening are alternatively either discarded or modified in such a manner that they meet the requirements of the security screening.

21. A system as claimed in claim 1, wherein when the data flows according to the ATM communication protocol are practically terminated, the data packets of an ATM VP/VC are stored and an ATM VP/VC identifier is used as a basis for multiplexing data packets from one or more subscribers addressed to a particular service provider into shared VP/VC data flows between the data gateway and the service provider.

* * * * *